UNITED STATES PATENT OFFICE.

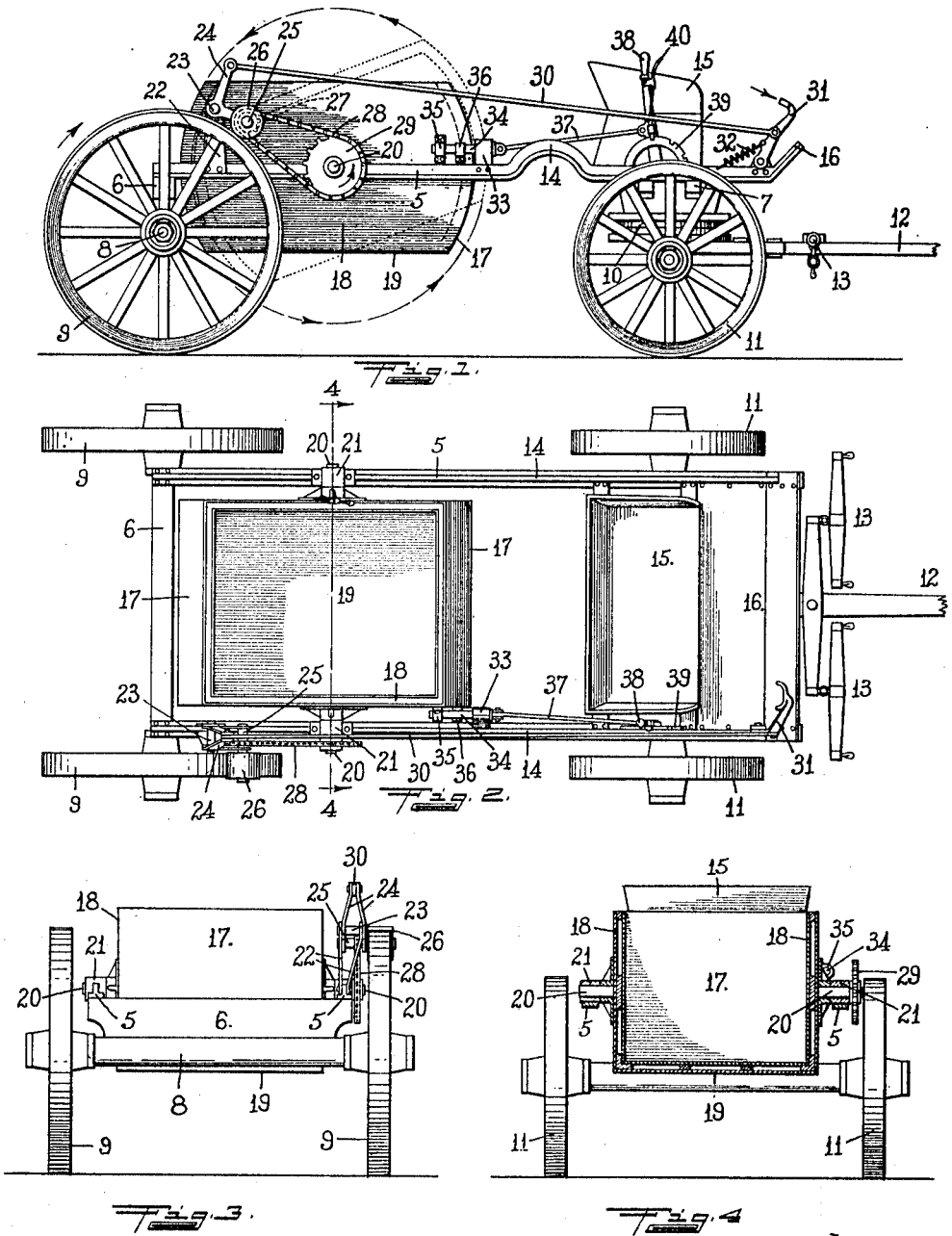

EDMUND PAULSEN, OF OMAHA, NEBRASKA.

DUMP-WAGON.

1,270,863.             Specification of Letters Patent.        Patented July 2, 1918.

Application filed June 23, 1916. Serial No. 105,387.

*To all whom it may concern:*

Be it known that I, EDMUND PAULSEN, a citizen of the United States, residing at Omaha, in the county of Douglas and State of Nebraska, have invented certain new and useful Improvements in Dump-Wagons, of which the following is a specification.

My invention relates particularly to dump wagons that are especially adapted for the transportation of heated asphaltic mixtures, such as are employed for paving streets and the like. It is the object of my invention to provide a dump wagon having an invertible pivotally-mounted body with insulated or heat-retaining walls; to provide means, controllable by the driver, for actuating the body to invert the same and discharge the contents thereof during forward movement of the vehicle; to provide a stop for preventing continuation of the rotational dumping movement as the body reaches its normal position; and to provide means for locking the body in such normal position.

In the accompanying drawings Figure 1 is a side view of a wagon embodying my invention, Fig. 2 is a plan view of the same, Fig. 3 is a rear elevation thereof, and Fig. 4 is a transverse vertical section on the plane of the line 4—4 of Fig. 2.

In carrying out my invention I provide a wheeled vehicle or wagon having a rectangular open frame consisting of metal side-bars 5, a rear bolster 6 and a front bolster 7. The rear bolster rests upon and is fixedly secured to an axle 8 which is supported by the rear wheels 9 of the vehicle. The front bolster 7 rests upon the usual truck-body or fifth-wheel 10 which is supported by the front wheels 11 and is provided with a tongue 12 and the ordinary draft rigging 13 for hitching horses to the wagon. The side-bars 5 have upwardly-bowed portions 14 at the waist to enable the wheels 11 to pass beneath them when making short turns. Above the front bolster 7 there is a seat 15 for the driver, and a suitable foot-board or dash 16.

The wagon-body is cylindro-segmental in form, being open at the top, and having curved convex ends 17 symmetrical about a common horizontal axis, flat sides 18, and a flat bottom 19, all of which are preferably of metal and double-walled, as shown in Fig. 4, so as to provide an air-space between the inner and outer surfaces. On the sides 18 are laterally-extending trunnions 20 which are journaled in suitable bearings 21 mounted on the side-bars 5. Said trunnions are located symmetrically with respect to the upper and lower edges of the body, but are slightly in front of the longitudinal center thereof, so that when uniformly loaded the body will have a slight tendency to tilt rearwardly.

To one of the side-bars 5, near the rear end thereof, is secured a forked standard or bracket 22, and in the upper end of said standard there is a short transverse shaft 23 on which is pivoted an L-shaped lever or bell-crank 24 consisting of two similar laterally-spaced portions, as shown in Fig. 3. In the end of the lower or forwardly-extending arm of said lever there is journaled a shaft 25, on the outer end of which is secured a friction-wheel 26, said wheel being positioned near and alined transversely with the tire or rim of one of the rear wheels 9 of the wagon. On the inner part of the shaft 25 is secured a small sprocket-wheel 27 which is connected by means of a chain 28 with a sprocket-wheel 29 secured on one of the body-trunnions 20. The upper arm of the lever 24 is connected by means of a rod 30 with a foot-lever 31 which is pivoted on the frame at a position such as to be conveniently reached by the driver of the wagon when seated upon the seat 15. A spring 32 is connected with the lever 31 and normally pulls the same toward a vertical position at which the rod 30 is pushed rearwardly and holds the lever 24 up to such a position that the wheel 26 will not engage the wheel 9. By pressing the foot-lever forwardly and downwardly the lever 24 is moved so as to forcibly press the friction-wheel 26 against the wheel 9, and, when the wagon is moving forwardly, such engagement of the wheels tends to actuate the sprocket-wheels 27 and 29, and rotate the wagon-body about its trunnion-axis in the direction shown by arrows in Fig. 1.

On one of the side-bars 5 near the bowed portion 14 there is secured a guide 33 in which a lock-bar 34 is slidable horizontally. The rearward end of said lock-bar extends normally into a socket formed by a U-shaped strap 35 which is secured on the side 18 of the wagon-body near the front end thereof. The lower side of the lock-bar is also engaged by a hook or angle-plate 36 which is secured on the side 18 slightly in front of the U-strap 35, as shown. The front end of the lock-bar is connected by means of a rod 37 with a lever 38 which is pivoted to the frame alongside the seat 15. The notched segment 39, positioned alongside the lever, is engaged by a releasable latch-device 40 carried on the lever, and holds the lever normally in the approximately vertical position shown in Fig. 1. By pushing the lever 38 forwardly to a position at which the latch-device is engageable with the lower or forward notch in the segment 39, the lock-bar is moved forward so as to be disengaged from the strap 35 and angle-plate 36. When the latch on the lever is engaged in the central or intermediate one of the three notches shown in the segment 39, the lock-bar is held at a position such that it is disengaged from the strap 35 but is still engageable by the angle-plate 36.

From the foregoing description of the mechanism the operation of the same will be readily understood. The air-space of the double-walled body facilitates the retention of a suitable temperature of the contents of the body, when the wagon is used for the transportation of asphaltic mixtures from the mixing plant to the place where paving or the like is being done. When it is desired to dump the contents of the body, the driver moves the lever 38 to the extreme forward position thereof, thereby disengaging the lock-bar 34 from the parts 35 and 36. Then, owing to the location of the trunnion-axis in front of the geometrical axis of the body, the latter will tilt rearwardly from its normal horizontal position to a vertical position at which a large part of the contents of the body will be discharged therefrom. This may be done while the wagon is either stationary or in motion. After the releasing of the lock-bar, if the wagon is moving, or when its forward motion is commenced if it were stationary upon release of the lock-bar, the foot-lever 31 is depressed to engage the friction-wheel 26 with the wagon-wheel 9. The body is thereby rotated to a fully inverted position, and a continuation of its rotation in the same direction will return it to the normal horizontal position. Before the body reaches the latter position, however, the lever 38 is moved to the intermediate position at which the lock-bar is held in the path of the angle-plate 36, thereby forming a stop to prevent the body passing beyond said normal horizontal position. As the body approaches the normal position the foot-lever is released, and after the part 36 engages the lock-bar the lever 38 is moved back to the normal position thereof at which the end of the lock-bar enters the socket formed by the U-strap 35 and prevents rotation of the body in either direction.

Now, having described my invention, what I claim and desire to secure by Letters Patent is:

1. In a dump-wagon, a wheeled vehicle-frame, a wagon-body mounted on said frame and rotatable about a horizontal transverse axis unidirectionally from a normal horizontal position to an inverted position and thence to the normal position again, connecting means between one of the vehicle-wheels and said body for rotating the latter, a lock-bar slidably mounted on the frame, means on the rotatable body forming a socket for engagement with said lock-bar, a stop on the body alined with said socket, and means for moving the lock-bar to positions for engaging the stop only, for engaging both the stop and socket, and for disengagement from both the socket and stop, for the purpose described.

2. In a dump-wagon, a wheeled vehicle-frame having longitudinal side-members, a wagon-body mounted between said side-members and adapted for complete rotation therebetween about a transverse axis, means actuatable by the vehicle-wheels for rotating said body, releasable means for fixedly connecting the frame and body when the latter is in a normal horizontal position, and a stop carried by the body and engageable with said releasable means to prevent rotation of the body past the normal position.

3. In a dump-wagon, a wagon-body having laterally extending trunnions, a wheeled vehicle-frame having side-bars on which said trunnions are revolubly mounted to enable complete rotation of the body about the trunnion-axis, rotary actuating means connected with one of the trunnions, means for frictionally engaging said rotary actuating means with one of the vehicle-wheels to actuate the body therefrom, a longitudinally movable lock-bar carried on the frame, a stop on the body engageable with said lock-bar when the latter is in one position, and socket-forming means on the body engageable by said lock-bar at another position thereof.

EDMUND PAULSEN.

Copies of this patent may be obtained for five cents each, by addressing the "Commissioner of Patents, Washington, D. C."